United States Patent
Hannig et al.

(10) Patent No.: US 11,186,709 B2
(45) Date of Patent: Nov. 30, 2021

(54) CARRIER MATERIAL ON THE BASE OF A PLASTIC COMPOSITION AND A MINERAL BASED SOLID COMPOSITION FOR DECORATED WALL OR FLOOR PANELS

(71) Applicant: Akzenta Paneele + Profile GMBH, Kaisersesch (DE)

(72) Inventors: Hans-Jürgen Hannig, Bergisch Gladbach (DE); Egon Hoff, Mastershausen (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 16/430,854

(22) Filed: Jun. 4, 2019

(65) Prior Publication Data

US 2019/0367716 A1   Dec. 5, 2019

(30) Foreign Application Priority Data

Jun. 5, 2018   (EP) .................................... 18175889

(51) Int. Cl.
| | | |
|---|---|---|
| *C08L 23/14* | (2006.01) | |
| *C08L 23/06* | (2006.01) | |
| *C08L 23/12* | (2006.01) | |
| *C08L 23/16* | (2006.01) | |
| *B44C 5/04* | (2006.01) | |

(52) U.S. Cl.
CPC ................ *C08L 23/14* (2013.01); *B44C 5/04* (2013.01); *C08L 23/06* (2013.01); *C08L 23/12* (2013.01); *C08L 23/16* (2013.01); *C08L 2205/025* (2013.01); *C08L 2205/03* (2013.01); *C08L 2207/066* (2013.01); *C08L 2207/10* (2013.01)

(58) Field of Classification Search
CPC .......... C08L 23/14; C08L 23/06; C08L 23/12; C08L 23/16; B44C 5/04
See application file for complete search history.

(56) References Cited

U.S. PATENT DOCUMENTS

| | | |
|---|---|---|
| 4,411,931 A | 10/1983 | Duong |
| 6,096,383 A | 8/2000 | Berg et al. |
| 6,888,147 B1 | 5/2005 | Hansson et al. |
| 8,011,299 B2 | 9/2011 | Vosahlo |
| 2002/0059762 A1 | 5/2002 | Takeuchi et al. |
| 2004/0009338 A1 | 1/2004 | Jo et al. |
| 2007/0035601 A1 | 2/2007 | Jang |
| 2009/0305008 A1 | 12/2009 | Nichols et al. |
| 2011/0129778 A1 | 6/2011 | Murata et al. |
| 2013/0176370 A1 | 7/2013 | Loccufier |
| 2014/0349087 A1 | 11/2014 | Jung et al. |
| 2015/0343761 A1 | 12/2015 | Roeder et al. |
| 2016/0067949 A1 | 3/2016 | Peltola |
| 2017/0008334 A1 | 1/2017 | Hoff |
| 2018/0272796 A1 | 9/2018 | Hannig |
| 2019/0241009 A1 | 8/2019 | Hannig et al. |
| 2019/0367716 A1 | 12/2019 | Hannig et al. |

FOREIGN PATENT DOCUMENTS

| | | |
|---|---|---|
| CL | 43115 | 9/2005 |
| CL | 201400262 | 11/2014 |
| CL | 201800592 | 6/2018 |
| CN | 102119076 A | 7/2011 |
| DE | 19722339 A1 | 12/1998 |
| DE | 102013105728 A1 | 12/2014 |
| DE | 202016101306 U1 | 4/2016 |
| EP | 0897948 A1 | 2/1999 |
| EP | 1836232 A1 | 9/2007 |
| EP | 2829415 A1 | 1/2015 |
| EP | 2942208 A1 | 11/2015 |
| EP | 3147135 A1 | 3/2017 |
| JP | 2016508080 A | 3/2016 |
| RU | 2518168 C2 | 6/2014 |
| RU | 2647233 C1 | 3/2018 |
| UA | 32517 U | 5/2008 |
| UA | 32585 U | 5/2008 |
| UA | 49197 U | 4/2010 |
| WO | WO-2004043667 A1 | 5/2004 |
| WO | WO-2008122668 A1 | 10/2008 |
| WO | WO-2015128255 A1 | 9/2015 |

(Continued)

OTHER PUBLICATIONS

Office Action regarding Chinese Patent Application No. 201780066858X, dated Jul. 3, 2020.

Decision to Grant issued in corresponding Ukrainian Application No. a 2019 05661 by the Ukrainian Patent Office dated Aug. 21, 2020.

Office Action regarding Korean Patent Application No. 10-2019-7014856, dated Jun. 10, 2020.

(Continued)

*Primary Examiner* — Peter D. Mulcahy (74) *Attorney, Agent, or Firm* — Harness, Dickey & Pierce, P.L.C.

(57) ABSTRACT

A carrier material for producing a decorated wall or floor panel, as well as the corresponding wall or floor panel, may comprise a matrix material and a solid material. The matrix material is present from ≥25 wt.-% to ≤55 wt.-% and the solid material is present from ≥45 wt.-% to ≤75 wt.-% of the carrier material. The matrix material and the solid material together may be present in an amount of ≥95 wt.-% of the carrier material. The solid material is formed to at least 50 wt.-% of a solid composition consisting of at least a first layered silicate powder and a second layered silicate powder. The matrix material is formed to at least 50 wt.-% by a plastic composition consisting of a homopolymer and at least a first copolymer and a second copolymer.

14 Claims, 2 Drawing Sheets

(56) References Cited

FOREIGN PATENT DOCUMENTS

WO     WO-2015158649 A1     10/2015
WO     WO-2016091819 A1     6/2016

OTHER PUBLICATIONS

Office Action regarding Chilean Application No. 201901137, dated Jun. 17, 2020; 14 pages.
Office Action regarding Chilean Patent Application No. 202002181, dated Jun. 18, 2021.
Office Action regarding Russian Patent Application No. 2020142772/03, dated Jun. 24, 2021.

CARRIER MATERIAL ON THE BASE OF A PLASTIC COMPOSITION AND A MINERAL BASED SOLID COMPOSITION FOR DECORATED WALL OR FLOOR PANELS

CROSS-REFERENCE TO RELATED APPLICATIONS

This application claims the benefit and priority of European Application No. 18175889.7 filed Jun. 5, 2018. The entire disclosure of the above application is incorporated herein by reference.

FIELD

The present invention relates to a carrier material for producing a decorated wall or floor panel, as well as a wall or floor panel comprising such a carrier material.

BACKGROUND

Decorated panels are known per se, wherein the term wall panel also means panels which are suitable as a ceiling or door lining. They usually consist of a carrier or core of a solid material, such as a wood material, which is provided on at least one side with a decorative layer and a covering layer and optionally with further layers, such as a wearing layer disposed between the decorative and the covering layer. The decorative layer is usually a printed paper impregnated with a resin. The top layer and the remaining layers are usually made of resin, too.

From the document EP 2 829 415 A1 there is further known a method for producing a decorated wall or floor panel in which, starting from a granular carrier material, a carrier and subsequently a panel is formed. In such a method, for example, a WPC can be used as a carrier material.

From EP 3 147 135 A1 a carrier material is known in which talcum is used as a mineral filler in a polymer matrix and which is suitable for producing decorated wall and floor panels.

Under certain circumstances, the production of the panels can still offer potential for improvement. Potential for improvement may arise in particular with regard to the elastic properties of wall or floor panels.

It is therefore the object of the present invention to provide an improved carrier material for the production of carrier plates for decorated wall or floor panels, which allows the production of carrier plates for decorated wall or floor panels with improved elastic properties.

This object is achieved by a carrier material according to claim 1 and further by a panel according to claim 15. Preferred embodiments of the invention are specified in the dependent claims, in the description or in the figures, wherein further features described or shown in the dependent claims or in the description or in the figures may individually or in any combination represent an object of the invention, if the opposite is not clearly obvious from the context.

The invention proposes a carrier material for producing a carrier for a decorated wall or floor panel.

The carrier material comprises a matrix material and a solid material, wherein the matrix material, based on the carrier material, is present in an amount from ≥25 wt.-% to ≤55 wt.-%, in particular from ≥35 wt.-% to ≤45 wt. %, and wherein the solid material, based on the carrier material, is present in an amount from ≥45 wt.-% to ≤75 wt.-%, in particular from ≥55 wt.-% to ≤65 wt.-%, and wherein the matrix material and the solid material together, based on the carrier material, are present in an amount of ≥95 wt.-%, in particular ≥99 wt.-%, and the solid material, based on the solid material, is formed to at least 50 wt.-%, in particular at least 80 wt.-%, in particular at least 95 wt.-% of a solid composition consisting of at least a first layered silicate powder and a second layered silicate powder, and the matrix material, based on the matrix material, is formed to at least 50 wt.-%, in particular at least 80 wt.-%, in particular at least 95 wt.-%, of a plastic composition consisting of a homopolymer and at least a first copolymer and a second copolymer.

It could be shown in a surprising manner that based on such a carrier material carrier plates for a wall or floor panel can be provided, which while having good mechanical properties such as dimensional stability, in particular with respect to moisture and temperature, and good manufacturability have improved elastic properties compared to known mineral polymer composites. The elastic properties can be described, for example, by the flexural modulus, the flexural strength or the flexural strain. The good manufacturability of the carrier plate may be due in particular to an advantageous mass flow rate of the carrier material. Furthermore, a carrier provided on the basis of such a carrier material can have an advantageous impact strength. A panel provided from the carrier material can have a good bond strength.

In the sense of the invention, the term "decorated wall or floor panel" or "decorative panel" is to be understood in particular as wall, ceiling, door or floor panels comprising a decoration which replicates a decoration template and is applied onto a carrier plate. Decorative panels are used in a variety of ways both in the field of interior design of rooms and for decorative claddings of buildings, for example in exhibition stand construction. One of the most common application fields of decorative panels is their use as a floor covering. Herein, the decorative panels often comprise a decoration intended to replicate a natural material.

Examples of such replicated natural materials or decoration templates are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

Correspondingly, a "decoration template" in the sense of the present invention may be understood in particular as such an original natural material or at least a surface thereof which is to be imitated or replicated by the decoration.

A "pourable" material may in particular be understood as a material which can be applied onto a subsurface by a pouring process or spreading process. In this case, the material may be present as a fluid or in particular as a pourable solid.

Furthermore, a "granulate" or a "granular material" can be understood as a solid or a heap of a solid which comprises or consists of a plurality of solid particles, such as grains or spheres. By way of example, but not exhaustive, grainy or powdery materials may be mentioned here.

A "carrier" may in particular be understood as a layer which serves as a core or as a base layer in a finished panel and which may in particular comprise a natural material, such as a wood-based material, a fiber material or a material comprising a plastic. For example, the carrier may already impart an appropriate stability to the carrier or may contribute thereto.

Accordingly, a carrier material can be understood as a material which forms the carrier at least to a predominant part. In particular, the carrier can consist of the carrier material.

A "web-shaped carrier" may be understood as a carrier which, for example, in its production process, has a web-shape and therefore a significantly greater length compared to its thickness or width and whose length may be, for example, greater than 15 meters.

In the sense of the present invention, a "plate-shaped carrier" can further be understood as a carrier which is formed by separation from the web-shaped carrier and is formed in the shape of a plate. Moreover, the plate-shaped carrier may already define the shape and/or size of the panel to be produced. However, the plate-shaped carrier can also be provided as a large plate. A large plate in the sense of the invention is in particular a carrier whose dimensions several times exceed the dimensions of the final decorative panels, and which in the course of the manufacturing process is separated in a corresponding plurality of decorative panels, for example by sawing, laser or water jet cutting. For example, the large plate can correspond to the web-shaped carrier.

A previously described carrier material thus serves in particular to produce a carrier for a decorated wall or floor panel. The carrier material comprises essentially two materials, wherein a material in the sense of the present invention can be understood as both a homogeneous material, i.e. a material formed from only one substance, and a heterogeneous material, i.e. a material consisting of at least two substances, wherein the latter material can thus also be understood as a substance mixture.

In detail, the carrier material comprises a solid material and a matrix material. It is provided that the matrix material, based on the carrier material, is present in an amount from ≥25 wt.-% to ≤55 wt.-%, in particular from ≥35 wt.-% to ≤45 wt.-%. Furthermore, it is provided that the solid material, based on the carrier material, is present in an amount from ≥45 wt.-% to ≤75 wt.-%, in particular from ≥55 wt.-% to ≤65 wt.-%.

Depending on the desired field of application and the desired properties of the panel, the proportions of matrix material or solid material may be selectable. As a result, a good adaptability to the desired field of application becomes possible. In principle, however, it may be preferred that the proportion of the solid material is greater than or equal to the proportion of the matrix material.

It is further provided that the matrix material and the solid material together, based on the carrier material, are present in an amount of ≥95 wt.-%, in particular ≥99 wt.-%.

In other words, it may be provided that in addition to the solid material and the matrix material further substances are present in the carrier material only in a proportion, based on the carrier material, of <5 wt.-%, preferably of <1 wt.-%. Thus, it may be advantageous that the carrier material consists to a large extent of the solid material and the matrix material. Particularly preferably, it may be provided that the matrix material and the solid material together, based on the carrier material, are present in an amount of 100 wt.-%, i.e. the carrier material thus consists of the matrix material and the solid material.

By limiting the materials of the carrier material and thus by a small number of materials for producing the carrier, the carrier can be produced particularly cost-effective. In addition, the process control of the production of a carrier or a panel can be very simple, so that, moreover, an easy and cost-effective production is enabled.

In detail, it is further provided that the solid material, based on the solid material, is formed to at least 50 wt.-%, in particular at least 80 wt.-%, in particular at least 95 wt.-% from a solid composition consisting of at least a first layered silicate powder and a second layered silicate powder.

A layered silicate powder is to be understood in a conventional manner as a powder of a layered silicate. Layered silicate in a known manner refers to minerals from the group of silicates whose silicate anions are usually arranged in layers. For example, layered silicates are understood as minerals from the mica group, the chlorite group, the kaolinite group and the serpentine group.

Thus, the solid material is advantageously formed at least by a large part of the mineral substance layered silicate, wherein this substance can be used for example in a powder form or may be present in the carrier material in the form of particles. In principle, the solid material can consist of a powdery solid.

Layered silicates offer the advantage that they enable the production of a carrier with good mechanical properties and at the same time can be appropriately processed to corresponding powders due to their layer structure.

In one embodiment of the invention, the first layered silicate powder or the second layered silicate powder may comprise talcum. Talcum is understood in a manner known per se as a magnesium silicate hydrate, which may have, for example, the chemical formula $Mg_3[Si_4O_{10}(OH)_2]$. In a further embodiment of the invention, the first layered silicate powder and the second layered silicate powder may comprise talcum. In a further preferred embodiment, the first layered silicate powder and the second layered silicate powder consist to at least 80 wt.-%, particularly preferably at least 95 wt.-%, of talcum.

In particular talcum offers the advantage that it allows a particularly gentle production of the carrier, since it can be embedded in the matrix material without any problems and thus does not exert an abrasive effect on press units used.

In one embodiment of the invention it can be provided that the solid composition comprises the first layered silicate powder from ≥35 to ≤85 wt.-%, preferably ≥50 to ≤70 wt.-%, for example 60 wt.-%, based on the solid composition and the second layered silicate powder from ≥15 to ≤65 wt. %, preferably ≥30 to ≤50 wt.-%, for example 40 wt.-%, based on the solid composition.

The first layered silicate powder may preferably be present in the solid composition in the form of particles having a particle size D50 in a range from ≥3 μm to ≤6 μm, preferably in a range from ≥4 μm to ≤5 μm, for example of 4.5 μm, and/or having a particle size D98 in a range from ≥10 μm to ≤30 μm, preferably in a range from ≥15 μm to ≤20 μm, for example of 17 μm. Further preferably, the second layered silicate powder can be present in the solid composition in the form of particles having a particle size D50 in a range from ≥6 μm to ≤10 μm, preferably in a range from ≥7 μm to ≤9 μm, for example of 8 μm, and/or the having a particle size D98 in a range from ≥20 μm to ≤40 μm, preferably in a range from ≥25 μm to ≤35 μm, for example of 28 μm.

In particular, by use of layered silicate powder with particles in the predetermined particle size distributions, it is possible to produce carriers or panels with preferred mechanical properties.

By providing a first and a second layered silicate powder in the form of different particles for the solid composition, depending on the desired field of application and the desired properties of the panel, the proportion of the first and the second layered silicate powders can be selectable. As a result, a good adaptability to the desired field of application becomes possible. In principle, however, it may be preferred that the proportion of the first layered silicate powder, based on the solid composition, is greater than or equal to the proportion of the second layered silicate powder. Furthermore, it may be preferred in principle that the first layered silicate powder is present in the form of particles having a particle size D50 which is smaller than the particle size D50 of the particles of the second layered silicate powder.

For determining the particle size distribution, it is possible to rely on the generally known methods, such as, for example, laser diffractometry, by means of which particle sizes in the range from a few nanometers up to several millimeters can be determined. This method can also be used to determine D50 or D98 values, which respectively indicate that 50% (D50) or 98% (D98) of the measured particles are smaller than the value respectively specified. The same applies to the determination of the grain size or mean grain size. These values, too, can be determined preferably by means of laser diffractometry. In the case of a deviation of the measured values obtained by means of different measuring methods, the value determined by means of laser diffractometry is regarded as decisive on the part of the applicant.

It may be advantageous if the specific surface density according to ISO 4352 (BET) of the particles of the first and/or the second layered silicate powder is in a range from ≥4 m2/g to ≤8 m2/g, approximately in a range from ≥5 m2/g to ≤7 m2/g.

Furthermore, it may be advantageous if the first layered silicate powder is present at a bulk density according to DIN 53468 in a range from ≥2.4 g/cm3 to ≤3.6 g/cm3, such as in a range from ≥2.9 g/cm3 to ≤3.1 g/cm3. Furthermore, it may be advantageous if the second layered silicate powder is present at a bulk density according to DIN 53468 in a range from ≥3.4 g/cm3 to ≤4.6 g/cm3, such as in a range from ≥3.9 g/cm3 to ≤4.1 g/cm3. In particular, it can be provided that the first layered silicate powder is present at a bulk density according to DIN 53468 which is less than or equal to the bulk density at which the second layered silicate powder is present.

The matrix material serves in particular to accommodate or embed the solid material in the finished carrier. The matrix material in this case comprises a plastic composition. In particular with reference to the manufacturing method, as described in detail below, it may be advantageous if the matrix material comprises a thermoplastic. This allows the carrier material or a component of the carrier material to have a melting point or a softening point such that the carrier material can be formed in a further step by heat exposure, as described in detail below with reference to the method. The matrix material may in particular consist of a plastic composition and optionally a bonding agent.

In detail, it is provided that the matrix material, based on the matrix material, is formed to at least 50 wt.-%, in particular at least 80 wt.-%, in particular at least 95 wt.-% of a plastic composition consisting of a homopolymer and at least a first copolymer and a second copolymer.

A previously described carrier material offers in particular the advantage to obtain a panel with good moisture resistance. In particular, by use of a carrier material as described above, it can be significantly reduced or even completely prevented that a panel produced from the carrier material swells when exposed to moisture. Furthermore, a heat-related expansion can be prevented or at least significantly reduced. This enables that a laying or attaching process of the panels produced with the carrier material is significantly simplified and/or that problems after laying or attaching the panels are significantly reduced.

At the same time, the carrier material offers the advantage that panels produced thereof have a very good stability, so that the risk of damages of the panel during transport and during use is extremely low. This can be achieved in particular by the solid material, i.e. in particular by the first and the second layered silicate powders contained. As a result, it can be achieved in particular that panels produced thereof have an advantageous impact strength. For example, based on the carrier material a panel may be provided which has an impact strength from ≥11 kJ/m2 to ≤13 kJ/m2, preferably from ≥11.5 kJ/m2 to ≤12.0 kJ/m2.

Due to the fact that the matrix material in particular comprises a plastic, such as a thermoplastic, it can be enabled despite the high stability that panels produced from the carrier material can be very elastic or springy and/or pliable, which allows a comfortable impression when walking thereon and further to reduce the occurring noises when walking thereon compared to conventional materials, thus an improved footfall sound can be realized.

In particular, thermoplastics also offer the advantage that the products made therefrom can be recycled very easily. This results in a further possibility for reducing the production costs.

A carrier made of the carrier material can moreover be provided with a decoration without any problems. For example, such a carrier is very suitable for printing, in particular by a digital printing process, for example an inkjet printing process. As a result, such carriers can be easily provided with a high-quality decoration which enables the production of a high-quality panel.

In particular, a mixture of a homopolymer and a first copolymer and a second copolymer for the matrix material may enable particularly advantageous properties. Such materials also offer the advantage that they can be formed into a carrier even at low temperatures, such as in a range from ≥180° C. to ≤200° C. in the method described above, such that a particularly effective process control, such as with exemplary line speeds in a range of 6 m/min, can be enabled. The effective process control can be achieved in particular due to the fact that the carrier material has an advantageous mass flow rate. By means of the mixture of a homopolymer and a first copolymer and a second copolymer it can be achieved, for example, that the carrier material has a mass flow rate of ≥20 g/10 min to ≤30 g/10 min, preferably from ≥24 g/10 min to ≤26 g/10 min. In particular, the use of at least two copolymers may be advantageous since this allows to achieve improved elastic properties of the carrier produced. In particular, it can be achieved that panels produced with the carrier material have an advantageous flexural modulus. On the basis of the carrier material, for example, a panel can be provided which has a flexural modulus from ≥3000 MPa to ≤4000 MPa, preferably from ≥3400 MPa to ≤3600 MPa. Moreover, it can be achieved that panels produced with the carrier material have an advantageous flexural strength. On the basis of the carrier material, for example, a panel can be provided which has a flexural strength from ≥30 MPa to ≤34 MPa, preferably from ≥31 MPa to ≤33 MPa. Furthermore, it can be achieved that panels produced with the carrier material have an advantageous bending strain. On the basis of the carrier material, for example, a panel can be provided which has a bending strain from ≥2.0% to ≤2.8%, preferably from ≥2.3% to ≤2.5%.

It may be preferable that the homopolymer, the first copolymer and the second copolymer include polypropylene. Polypropylene is particularly suitable as a matrix material, since it is available on the one hand at low cost and on the other hand has good properties as a thermoplastic material as a matrix material for embedding the solid material.

In particular, by use of a homopolymer a high melt flow rate can be enabled, wherein the melt flow rate of the homopolymer may in particular be greater than that of the first copolymer and the second copolymer. This can allow a particularly good formability of the carrier during the manufacturing process. Furthermore, the homopolymer can thereby allow a particularly good embedding of the solid material. It can therefore be particularly advantageous if the homopolymer is one which has a melt mass flow rate of ≥20 g/10 min, particularly preferably ≥50 g/10 min, for example 52 g/10 min. The melt mass flow rate can be determined according to ISO 1133.

Furthermore, it may be advantageous if the homopolymer has a tensile strength according to ISO 527-2 which is in a range from ≥30 MPa to ≤45 MPa, for example in a range from ≥35 MPa to ≤40 MPa, in order to achieve a good stability.

Furthermore, in particular with respect to a good stability, it may be advantageous if the homopolymer has a flexural modulus according to ISO 178 in a range from ≥1200 MPa to ≤2200 MPa, for example in a range from ≥1400 MPa to ≤2000 MPa, such as in a range from ≥1600 MPa to ≤1800 MPa.

With regard to the tensile deformation of the homopolymer according to ISO 527-2 it may also be advantageous if it is in a range from ≥5% to ≤13%, for example in a range from ≥8% to ≤10%.

For a particularly advantageous manufacturability it may be provided that the Vicat softening temperature according to ISO 306/A of the homopolymer for an injection-molded component is in a range from ≥130° C. to ≤170° C., for example in a range from ≥145° C. to ≤158° C.

In contrast, the first copolymer can in particular serve the mechanical strength of the carrier material or of the carrier. In particular, the melt flow rate of the first copolymer may be smaller than that of the second copolymer and the homopolymer. This can allow to achieve a particularly good mechanical strength of the carrier material or of the carrier.

It may furthermore be particularly advantageous if the first copolymer is one which has a melt mass flow rate from ≥4 g/10 min to ≤12 g/10 min, for example from ≥6 g/10 min to ≤9 g/10 min, for example 7.5 g/10 min. The melt mass flow rate can be determined according to ISO 1133.

Furthermore, in particular for a good stability, it may be advantageous if the first copolymer has a tensile modulus according to ISO 527-1, -2 in a range from ≥900 MPa to ≤1400 MPa, for example in a range from ≥1100 MPa to ≤1250 MPa.

With respect to the tensile strength according to ISO 527-2 of the first copolymer, it may also be advantageous if it is in a range from ≥15 MPa to ≤27 MPa, for example in a range from ≥18 MPa to ≤24 MPa. In particular, the tensile strength of the second copolymer may be smaller than that of the homopolymer.

For an advantageous manufacturability, it may also be advantageous if the heat resistance of the first copolymer, in particular a heat distortion temperature B (0.45 MPa), not tempered, according to ISO 75B-1, -2 is in a range from ≥50° C. to ≤110° C., for example in a range from ≥70° C. to ≤90° C.

It may be particularly advantageous that the first copolymer has a ball indentation hardness according to ISO 2039-1 of ≥15 MPa, for example ≥30 MPa, more preferably ≥40 MPa. In particular, the ball indentation hardness of the first copolymer may be greater than that of the homopolymer.

For a particularly advantageous manufacturability it can be provided that the Vicat softening temperature according to ISO 306/A of the first copolymer for an injection-molded component is in a range from ≥125° C. to ≤165° C., for example in a range from ≥140° C. to ≤150° C.

It may therefore be particularly advantageous if the first copolymer comprises a heterophasic polypropylene. Furthermore, it may be advantageous if the first copolymer comprises at least 95 wt.-%, preferably at least 99 wt.-%, of a heterophasic polypropylene.

In contrast, the second copolymer may in particular serve the elastic properties of the carrier material or of the carrier. In particular, the melt flow rate of the second copolymer may be smaller than that of the homopolymer and larger than that of the first copolymer. This can enable particularly good elastic properties of the carrier material or of the carrier.

It can furthermore be particularly advantageous if the second copolymer is one which has a melt mass flow rate of ≥7 g/10 min, particularly preferably ≥19 g/10 min, for example 20 g/10 min. The melt mass flow rate can be determined according to ISO 1133.

Furthermore, it may be particularly advantageous if the second copolymer has a Shore A hardness according to ASTM D2240 from ≥55 to ≤75, more preferably ≥60 to ≤70, for example 66.

With respect to the breaking stress according to ASTM D638 of the second copolymer, it may also be advantageous if it is in a range from ≥4 MPa to ≤7 MPa, more preferably in a range from ≥5 MPa to ≤6 MPa, for example 5.5 MPa.

For a particularly advantageous manufacturability it can be provided that the Vicat softening temperature according to ISO 306/A or ASTM D1525 of the second copolymer for an injection-molded component is in a range from ≥40° C. to ≤54° C., for example in a range from ≥45° C. to ≤49° C.

It may therefore be particularly advantageous if the second copolymer comprises an ethylene-propylene copolymer and an isotactic polypropylene. Furthermore, it may be advantageous if the second copolymer comprises at least 95 wt.-%, preferably at least 99 wt.-%, of a mixture consisting of an ethylene-propylene copolymer and an isotactic polypropylene. The second copolymer particularly preferably has an ethylene content from ≥8 wt.-% to ≤22 wt.-%, preferably from ≥13 wt.-% to ≤17 wt.-%, for example 15%.

Thus, already within the matrix material a particularly simple and good control of the properties of the matrix material and thus of the carrier material may be possible. Such a control can thus be achieved by simply selecting the corresponding homopolymer or first copolymer and second copolymer and selecting the corresponding proportions by weight.

With respect to the distribution of homopolymer, first copolymer and second copolymer it may be preferable that the homopolymer, based on the plastic composition, is present in a proportion from ≥10 wt.-% to ≤40 wt.-%, such as in a proportion from ≥20 wt.-% to ≤25 wt.-%, and/or that the first copolymer, based on the plastic composition, is present in a proportion from ≥40 wt.-% to ≤70 wt.-%, such as in a proportion from ≥50 wt.-% to ≤60 wt.-%, and/or that the second copolymer, based on the plastic composition, is present in a proportion from ≥10 wt.-% to ≤40 wt.-%, such as in a proportion from ≥20 wt.-% to ≤25 wt.-%, For example, the proportion of the homopolymer may be 22 wt.-%, the proportion of the first copolymer may be 55 wt.-%, and the proportion of the second copolymer may be 23 wt.-%.

In particularly with such a configuration of the plastic composition particularly advantageous properties of the matrix material can be achieved. In detail, it has surprisingly been found that in particular the above described proportions of the homopolymer or of the first copolymer and of the second copolymer combine good processability with good stability and elasticity.

Furthermore, it may be preferred that the density of the first copolymer is greater than or equal to the density of the homopolymer and/or the density of the second copolymer is less than or equal to the density of the homopolymer. This feature, too, can result in a particularly preferred manufacturability in combination with particularly advantageous mechanical properties, in particular a particularly good stability, of a panel produced with the above-described carrier material. For example, the density of the homopolymer according to ISO 1183 may be in a range from ≥0.85 g/cm3 to ≤0.95 g/cm3, such as from ≥0.89 g/cm3 to ≤0.91 g/cm3, for example at 0.900 g/cm3. Furthermore, for example, the density of the first copolymer according to ISO 1183 may be in a range from ≥0.86 g/cm3 to ≤0.96 g/cm3, such as from ≥0.895 g/cm3 to ≤0.915 g/cm3, for example at 0.905 g/cm3. Moreover, for example, the density of the second copolymer according to ISO 1183 may be in a range from ≥0.82 g/cm3 to ≤0.90 g/cm3, such as from ≥0.85 g/cm3 to ≤0.87 g/cm3, for example at 0.863 g/cm3.

Furthermore, it may be preferred that the matrix material has at least one coloring additive in addition to the plastic composition. The coloring additive may preferably be a pigment preparation based on thermoplastic carrier materials. A pigment preparation based on thermoplastic carrier materials is to be understood in a known manner as a color granulate or so-called masterbatch which comprises a plastic granulate as a carrier material which comprises in particular color pigments in the highest possible concentration.

It can thereby be achieved that the carrier material is colored and can be used to produce a colored carrier in a method for producing a decorated wall or floor panel. By means of the preferred coloring additive, in particular in the form of a pigment preparation based on thermoplastic carrier materials, it can be achieved that the colored carrier has a particularly uniform color.

The plastic granules of the coloring additive may advantageously comprise polypropylene or polyethylene. It is advantageous if the color pigments do not contain lead and/or cadmium. Color pigments used may comprise, for example, copper phthalocyanine, quinacridone and/or diketopyrrolopyrrole. As a result, it can be achieved that the carrier material can be recycled in an environmentally friendly manner.

The coloring additive may advantageously have a temperature resistance up to at least 230° C., preferably at least 280° C., and a melting range from ≥95° C. to ≤125° C., preferably from ≥105° C. to ≤115° C. By means of such a coloring additive it can be achieved that the method for producing a decorated wall or floor panel changes the color only slightly, so that the color of the carrier material corresponds to the color of the carrier produced therefrom.

It can be provided particularly advantageously that the coloring additive is present in a proportion in the matrix material in a range of <50 wt.-%, in particular <20 wt.-%, for example <10 wt.-%, further for example <5 wt.-%. In this way it can be achieved that the mechanical properties of the colored carrier material are little affected compared to a non-colored carrier material.

Furthermore, it may be preferred that the matrix material comprises polyethylene in the form of LDPE. Such materials offer the advantage that they can be formed into a carrier already at low temperatures, such as in a range from ≥180° C. to ≤200° C., in the method described above, so that a particularly effective process control, for example at exemplary line speeds in a range of 6 m/min, can be enabled. In addition, LDPE is available at low cost.

In particular, when the matrix material comprises LDPE, it may be provided that the matrix material is free of a bonding agent. This embodiment can enable that the carrier material is particularly cost-effective, since it is possible to dispense with a component which should be added to the matrix material depending on the used polymer of the matrix material. In addition, the provision of the carrier material can be further simplified.

It may further be provided that the carrier material consists of at least a matrix material, a solid material and optionally a bonding agent. In particular, in this embodiment a production can be particularly cost-effective and the process control can be particularly simple, because the carrier material consists only of a solid composition, a plastic composition and in particular depending on the plastic used a bonding agent, which can be selected with respect to the plastic in a manner known per se.

It may also be advantageous if the solid material comprises a further solid in addition to the first layered silicate powder and the second layered silicate powder. As an example, the further solid can be selected from the group consisting of wood, for example in the form of wood flour, volcanic ash, pumice, cellular concrete, in particular inorganic foams, cellulose. With respect to cellular concrete, this may be, for example, the solid used by the company Xella under the brand name Ytong which consists essentially of quartz sand, lime and cement. With respect to the added solid this, for example, can be composed of particles having the same particle size or particle size distribution as the particle sizes or particle size distributions described above for the layered silicate powders. The further solids may be present in particular in a proportion in the solid material in a range of <50 wt.-%, in particular <20 wt.-%, for example <10 wt.-% or <5 wt.-%.

Alternatively, it may be provided, for example for wood, in particular for wood flour, that its particle size is between >0 μm and ≤600 μm with a preferred particle size distribution of D50≥400 μm.

Furthermore, the carrier material may comprise between ≥0 wt.-% and ≤10 wt.-% of further additives such as flowing agents, heat stabilizers or UV stabilizers.

For example, the carrier material may be present as a granulate and in this case may have a cylindrical shape. Furthermore, regardless of the shape but by way of example in a cylindrical form, the granular particles may have a diameter in a range from ≥2 mm to ≤3 mm, such as 2 mm or 3 mm, and a length from ≥2 mm to ≤9 mm, for example from ≥2 mm to ≤7 mm or ≥5 mm to ≤9 mm.

In summary, the above-described carrier material thus offers the advantage of a good manufacturability in combination with a high dimensional stability, in particular with regard to moisture and temperature influence, as well as good mechanical properties as well as elastic properties.

With regard to further technical features and advantages of the above-described carrier material it is hereby explicitly referred to the description of the panel, the method and the figures.

The present invention further relates to a decorated panel, in particular a decorated wall or floor panel, comprising a carrier and a decoration applied onto the carrier, wherein in particular a covering layer provided with a structure is applied onto the decoration. Such a panel is characterized in that the carrier comprises a carrier material as described in detail above. With reference to the specific features it is thus referred to the above description.

Moreover, the edge regions of the panel can be structured or profiled in order to provide in particular detachable connecting elements. In this regard, in a profiling in the sense of the invention it may be provided that at least in a part of the edges of the decorative panel a decorative and/or functional profile is formed by means of suitable material removing tools. Herein, a functional profile means for example the formation of a groove and/or tongue profile in an edge in order to make decorative panels connectable to each other by means of the formed profiles. Here, in particular with groove and/or tongue profiles, elastic materials are of advantage since by means of these alone such profiles can be produced, which are particularly easy to handle and stable. Thus, in particularly no further materials are necessary to produce the connecting elements. The carrier material can thereby enable the provision of panels which have a bonding strength according to ISO 24334 for a joint gap of 0.2 mm of ≥2.0 kN/m, preferably of ≥4.0 kN/m, in the longitudinal direction and of ≥2.5 kN/m, preferably of ≥4.5 kN/m, in the transverse direction.

In summary, the above-described panel can provide the advantage of a high dimensional stability with respect to heat and moisture influence with simultaneously good mechanical properties. Furthermore, such a panel can be very stable and at the same time have a high tensile strength, compressive strength, flexural strength and/or notch impact strength. At the same time, the panel may have a high degree of elasticity and/or bending softness, which may be advantageous in particular for an effective and cost-effective design of connecting elements at the edge region of the carrier and moreover with regard to footfall sound insulation.

With regard to further technical features and advantages of the panel, reference is hereby explicitly made to the description of the carrier material, the method and to the figures.

The invention further proposes a method for producing a decorated wall or floor panel, comprising the steps:

a) providing a pourable carrier material, in particular a granulate, wherein the carrier material is configured as described in detail above, b) arranging the carrier material between two belt-like conveying means, c) forming the carrier material under the action of temperature while forming a web-shaped carrier, d) compressing the carrier, e) treating the carrier under the action of pressure using a twin belt press, f) optionally cooling the carrier, g) optionally applying a decoration subsurface onto at least a portion of the carrier;

h) optionally applying of a decoration template replicating a decoration onto at least a portion of the carrier, and i) optionally applying a protective layer onto at least a portion of the decoration.

Further, the following steps may follow:

j) structuring the protective layer, and k) treating the carrier for electrostatic discharge and optionally for electrostatic charging prior to at least one of the aforementioned steps, in particular prior to one of the steps d) to i), for example, prior to step h).

It has surprisingly been shown that the method described above enables a particularly advantageous production in particular of a carrier of a wall or floor panel. In this case, the method can be particularly advantageous by using the carrier material as described in detail above.

It has in particular been found that the method described herein enables to obtain a particularly smooth and defined adjustable surface of the carrier, which, for example, can be particularly advantageous for the further processing into a panel, especially in the application of a decoration, for example by direct printing.

According to the present method first a carrier or a core is produced. For this purpose, the above-described method comprises according to step a) first of all the provision of a pourable carrier material. The carrier material serves as a basis for the production of in particular plate-shaped carriers for panels. In this regard, reference is made entirely to the above statements.

In a particularly advantageous manner, the carrier material can be provided as a pourable solid or as granules, wherein the granules depending on the material used purely by way of example may have a particle size in a range from ≥100 μm to ≤10 mm. A preferred fill or distribution of the carrier material may have a deviation of the bulk density of ≤5%, in particular ≤3%.

According to process step b), the pourable, in particular granular, carrier material is arranged between two belt-like conveying means. In detail, a lower belt-like conveying means is moved circumferentially, and at a defined distance from the lower conveying means an upper belt-like conveying means is moved circumferentially. The carrier material can be applied onto the lower conveying means and then restricted by the lower and the upper conveying means. By means of exact scattering a lateral boundary can be dispensed with. By means of the two conveying means, the carrier material can thus be conveyed to or through individual processing stations and processed into a carrier. Furthermore, the carrier material can already be preformed in this process step. Thus, the belt-like conveying means can assume two functions, namely that of a transport means and that of a mold.

In this case, the belt-like conveying means, at least in the region of the twin belt press, as described below, can be at least partially made of Teflon or polytetrafluoroethylene (PTFE). For example, the belts may be formed entirely of polytetrafluoroethylene, or belts provided with an outer coating of polytetrafluoroethylene may be used. In the latter case, glass fiber reinforced plastic strips or steel strips comprising a coating of polytetrafluoroethylene can be used. By means of such conveying means, a particularly defined, for example, smooth surface of the carrier produced can be obtained due to the anti-adhesion properties of this material. Thus, it can be prevented that the conveyed carrier material adheres to the conveying means and thus adversely affects the surface structure directly or by adhering material in a next cycle. In addition, polytetrafluoroethylene is resistant to chemicals as well as against decomposition even at high temperatures, so that on the one hand a temperature treatment of the carrier material is possible without any problems and on the other hand the conveying means are stable for a long period of time. In addition, the carrier material can be freely selectable.

The conveying means can pass through the entire device, or can be interrupted and configured as a plurality of conveying means.

The arrangement of the carrier material according to step b) can be realized in particular by means of one or a plurality of scattering heads, which can discharge the carrier material in a defined way for example from storage containers. In this case, a doctor blade may further be provided which sweeps the material in recesses of the roller. Subsequently, the material can be discharged by means of a rotating brush roller from the scattering roller, wherein it hits against a baffle and slides from there onto the conveying means. In order to regulate the spread width, moreover a spread width adjustment may be provided. In this embodiment, a particularly homogeneous discharge of the carrier material can take place, which can likewise lead to a homogeneous carrier with defined quality.

For example, one scattering head or two, three or more scattering heads can be provided. As a result, the carrier can be particularly customized in a particularly simple manner, for example by providing a desired material mixture. In this embodiment, the mixture can be adapted without any problems during the manufacturing process or between two batches, so that a particularly large variability can be ensured. In addition, by a different equipping of the individual scattering heads, a mixture for the carrier material can be generated only immediately prior to the processing, so that a mutual negative influence of the various components and a reduction in the quality of the carrier produced resulting therefrom can be prevented.

For example, a sensor for checking the arrangement of the carrier material may be provided between the two belt-like conveying means, for example with respect to the basis weight of the material applied or the homogeneity.

In a further step, according to step c) a forming of the carrier material arranged between the belt-like conveying means takes place under the action of temperature or heat. Thus, in this step by means of the applied thermal or heat energy a melting or softening of the carrier material or at least a part thereof takes place, whereby, for example, the granules can be formed. In this state, it can homogeneously fill the accommodation space forming between the conveying means and thus form a web-shaped carrier which can be further treated.

The thus formed web-shaped carrier can be compressed simultaneously with or after step c) according to step d). This step can be carried out in particular in a suitable press or roller. Thus, here a first compression of the web-shaped carrier takes place. In this step, the carrier can substantially already obtain its desired thickness such that in following processing steps only a slight compression needs to be carried out and thus the further steps may be implemented very gently, as will be explained in detail below. Herein, in particular, it can be ensured that the temperature of the carrier is cooled down sufficiently such that a suitable compressibility is enabled while achieving the desired result.

In a further step e) now a further treatment of the carrier under the influence of pressure with use of a twin belt press is implemented. In this step in particular the surface properties of the carrier can be adjusted or the thickness of the carrier can at least substantially be pre-adjusted. To this end, the previously compressed carrier can be treated under the influence of pressure, wherein in particular a low pressure can be selected such that this compression takes place only in a very small range. Thus, the design of the processing device in this step can be selected in particular depending on a desired adjustment of the compression, which may be particularly gentle and effective.

Here, in particular the use of a twin belt press can be advantageous, since with such a press particularly gentle compression steps are possible and moreover the surface quality or the thickness of the carrier can be adjusted particularly effective and defined. Furthermore, the use of a belt press in particular enables high line speeds such that the whole process enables a particular high throughput. Moreover, for example, by providing pneumatic cylinders a particularly uniform and defined adjustable belt tension of the twin belt press can be enabled.

Herein, smoothing or adjusting the surface quality in this step may mean that, while the uppermost surface is smoothed, already introduced structures or pores, however, are not influenced or are only influenced in a defined region, so that these even after this step may be present as desired, if required. This can be achieved in particular by the use of a belt press with a suitable temperature profile and with suitable pressure values, or by means of a calender, as described in detail below.

In particular, in heating of the carrier or the carrier material in preceding steps, it may be preferably provided that the carrier is cooled during or prior to step e), in particular below the melting point or the softening point of a plastic component of the carrier material. In other words, the carrier may be cooled upstream of or within the twin belt press. In this case, cooling can be implemented only in a limited range, so that the carrier still has an elevated temperature compared to room temperature (22° C.) but is below the preset elevated temperature and preferably and depending on the plastic material used below the melting point or the softening point of the plastic included in the carrier material. In particular, by cooling the carrier cupping or the occurrence of blowholes or pores can be avoided such that the surface of the carrier can be of particularly high quality. Suitable temperatures for polyethylene, for example, are in a range of below 130° C., in particular below 120° C., such as in a range from $\geq 80°$ C. to $\leq 115°$ C., without being restricted thereto.

With respect to the compression of the carrier in the twin belt press, it may be provided that step e) is realized by establishing a compression factor K1 of the carrier. A compression factor K in particular means a factor by which the thickness of the carrier is reduced in the treatment step. Thus, at an original thickness of the carrier prior to a treatment of 5 mm and a thickness of the carrier after the treatment of 4 mm a thickness of 80% with respect to the thickness prior to the treatment is provided, i.e. the thickness was reduced by 20%. Accordingly, the compression factor K1 is 0.2.

Exemplary compression factors for step e) are for example in a range of >0, for example $\geq 0.1$ to $\leq 0.3$, such as $\geq 0.15$ to $\leq 0.25$.

The above-described treatment of the carrier in step e) is implemented at a temperature T1. This temperature may for example be in a range from $\geq 150°$ C. to $\leq 190°$ C., for example from $\geq 160°$ C. to $\leq 180°$ C., such as 170° C. Due to the fact that the carrier comprises a plastic component, the carrier is comparatively soft in this temperature range and, therefore, moldable in particular over its entire thickness, so that a compression can be conducted particularly effectively even by use of low contact pressures of the twin belt press. This step can thus serve in particular a setting or calibration of the thickness of the carrier.

Optionally, according to the above-described step e) a further treatment of the carrier can be performed under the influence of pressure at a temperature T2 under formation of a compression factor K2 of the carrier, wherein T2<T1, and wherein K2<K1. In this case, the temperatures T1 and T2 relate in particular to the temperature acting on the carrier, so that it is possible that the carrier does not have the same temperature or does not necessarily have the same temperature over its entire thickness. This step therefore comprises a further treatment process of the carrier under the application of pressure, which for example, without being limited thereto, can immediately follow step e). In particular, the temperature T2 is preferably not adjusted merely by cooling during the treatment of the carrier by the lack of heating, but rather by the defined action of a respective tempering means, such as by means of active cooling by use of a respective tempering means.

The temperature T2 during step f) may enable, for example, by use of a carrier that the viscosity of the carrier is lower or the carrier is harder than at the temperature T1 used in step e).

This step f) may thus serve in particular not to compress the carrier significantly or reduce the thickness of the carrier, but rather to adjust the surface properties of the carrier and thus mainly to smoothen the carrier or its surface.

For example, without being limited thereto, in this step a compression can be carried out which can be in a range of in particular >0%, which, however, may be limited to values in a range of ≤20%, wherein the carrier, thus, subsequently has a thickness of 80% with respect to its thickness prior to step f). Thus, the compression factor K2 is less than the compression factor K1. Exemplary compression factors are in a range from >0 to ≤0.2, such as in a range from >0.03 to ≤0.15 or >0.05 to ≤0.12, exemplarily at 0.1.

In a post smoothing process, for example, a temperature can be set, which is above the crystallization temperature of the plastic material. In the case of linear polyethylene (LLDPE) as a component of the carrier, for example, a heating to a temperature in a range from ≥100° C. to ≤150° C., for example 120° C., can be sufficient and appropriate. In principle, therefore, the temperature T2 can be set such that, for example, it is in a range from ≥100° C. to ≤150° C., such as at 120° C.

By means of the above-described multi-stage compression process a very accurate and homogeneous thickness can be achieved in particular for panel carrier materials and, moreover, a particularly high surface quality can be achieved.

The post smoothing process can be carried out, for example, in the twin belt press by setting a temperature gradient along the conveying direction of the carrier. Alternatively, it may be provided that step e) and the post smoothing process described above are carried out in two separate pressing means. To this end, for example, a further twin belt press or a calender can be used for the post smoothing process. In the event that, for example, a twin belt press is used, this may in particular comprise a metal belt, such as, for example, a steel belt, in step f) in order to achieve a suitable compression pressure even in the chosen temperature range. Here, in step e) a plastic belt may be sufficient due to the relative higher temperature.

In a further preferred embodiment it can be provided that the carrier is cooled down between steps e) and f) to a temperature T3, wherein T3<T1, and wherein T3<T2. In a further preferred embodiment it can be provided that the carrier prior to or during process step f) is heated to a temperature which is above the crystallization temperature of a plastic material included in the carrier.

In the further course in a further step g) subsequently optionally a cooling of the web-shaped carrier is carried out. The carrier may be cooled in particular by providing a cooling means with defined cooling stages to a temperature which corresponds to the room temperature or merely by way of example in a range of up to about 20° C. thereabove. For example, a plurality of cooling zones may be provided in order to enable a defined cooling of the carrier.

Moreover, it may be provided that the carrier is heated after step f), in particular immediately after step f) and/or for example prior to the application of additional layers to a temperature above the crystallization temperature of one, for example of all, plastic materials present in the carrier. Then, the carrier can in turn be cooled down below the crystallization temperature, for example to room temperature (22° C.). In particular, when the carrier after the treatment of the carrier after step f), and in particular after a cooling of the carrier after step f) is reheated to a temperature above the crystallization temperature of the plastic material included in the carrier material, the properties of the carrier can be further improved. For example, the carrier may have improved stability properties, in particular in terms of its mechanical and/or thermal and/or chemical resistance. Thus, the quality of the carrier can be further improved.

Here, the crystallization temperature in the sense of the present invention is in particular a temperature to which the polymer must be heated in order to subsequently form crystals during the cooling process. In particular, the crystal formation starts during a cooling of the polymer at a temperature which may be below the melting temperature and possibly above the glass transition temperature. Accordingly, a heating to a temperature below the melting temperature of the respective plastic material or to a temperature below the melting temperature may be sufficient. In the case of linear polyethylene (LLDPE), for example, heating to a temperature in a range from ≥100° C. to ≤150° C., for example 120° C., may be sufficient. In the case of polypropylene, for example, heating to a temperature in a range from ≥160° C. to ≤200° C., for example, 180° C., may be sufficient.

Thus, the duration of the corresponding heating process in a manner obvious to those skilled in the art may be dependent on the speed of travel of the carrier, its thickness and the temperature to be set.

After a cooling of the carrier produced, the carrier can initially be stored as an intermediate product in a web-shaped form or as individual plate-like carriers and the method may momentarily be finished. Preferably, however, further treatment steps follow, which may, for example, be realized without a grinding process, in particular in order to process the carrier provided so as to produce a finished panel, as is explained in detail below.

In order to produce a finished panel, the method may comprise the following further steps to provide the carrier with a decoration and to coat it with a protective layer. Here, the following steps are preferably carried out immediately with the produced web-shaped carrier. However, it is also encompassed by the invention that the web-shaped carrier is first divided in a plurality of plate-shaped carriers prior to an appropriate one of the steps g) to i) and/or the plate-shaped carrier is further treated by the corresponding following process steps. The following explanations apply to both alternatives correspondingly, wherein for an easy understanding in the following reference is made to a treatment of the carrier.

It is also possible, if appropriate, to initially carry out a pretreatment of the carrier for electrostatic discharge for example prior to method step h) and optionally a subsequent electrostatic charging. This may in particular serve to avoid the occurrence of blurring in the course of the application of the decoration.

According to step g) further optionally a decoration subsurface may be applied onto at least a portion of the carrier. For example, first a primer in particular for printing processes may be applied as a decoration subsurface for example in a thickness of ≥10 µm to ≤60 µm. In this case, as a primer a liquid radiation curable mixture based on a urethane or a urethane acrylate, optionally with one or more of a photoinitiator, a reactive diluent, a UV stabilizer, a rheological agent such as a thickener, radical scavengers, leveling agent, antifoam or preservative, pigment, and/or a dye may be used.

In addition to the use of a primer it is possible to apply the decoration onto a decorative paper printable with a corresponding decoration, which may be provided for example by means of a resin layer as a bonding agent previously applied onto the carrier. Such a printing subsurface is suitable for flexographic printing, offset printing or screen printing processes and in particular for digital printing techniques such as inkjet processes or laser printing processes. For the application of the resin layer it may be preferably provided that a resin composition is applied which as a resin component includes at least one compound selected from the group consisting of melamine resin, formaldehyde resin, urea resin, phenol resin, epoxy resin, unsaturated polyester resin, diallyl phthalate or mixtures thereof. The resin composition may, for example, be applied at an application amount between ≥5 g/m2 and ≤40 g/m2, preferably ≥10 g/m2 and ≤30 g/m2. Further, a paper or a non-woven fabric with a grammage between ≥30 g/m2 and ≤80 g/m2, preferably between ≥40 g/m2 and ≤70 g/m2 may be applied onto the plate-shaped carrier.

Furthermore, according to step h) a decoration replicating a decoration template may be applied onto at least a portion of the carrier. In this case, the decoration may be applied by so-called direct printing. The term "direct printing" in the sense of the invention means the application of a decoration directly onto the carrier of a panel or onto an unprinted fiber material layer applied onto the carrier or a decoration subsurface. Here, different printing techniques such as flexographic printing, offset printing or screen printing may be used. In particular, for example, inkjet processes or laser printing processes can be used as digital printing techniques.

The decorative layers may be formed of an in particular radiation curable paint and/or ink. For example, a UV-curable paint or ink can be used.

Herein, the decorative layers may respectively be applied in a thickness in a range from ≥5 µm to ≤10 µm.

It can also be provided to apply in addition to a positive image with regard to the color and/or texture also a corresponding negative image of the decoration template. In detail, as is known, for example, from positive staining or negative staining of wood-based materials the color impression for example of a grain can be reversed by the use of digital data, such that a negative is obtained with respect to the color or in particular lighter and darker areas. In addition to the color impression corresponding results can also be obtained for the applied structure, such that also with respect to the structural design a negative can be realized. Even such effects can be integrated easily based on digital three-dimensional data and without lead-time or refittings in a manufacturing process.

According to step i) a protective layer can be applied onto at least a portion of the decoration. Such a layer for protecting the applied decoration can in particular be applied in a subsequent step as a wearing or covering layer on top of the decorative layer which in particular protects the decorative layer from wear or damage caused by dirt, moisture or mechanical impacts, such as abrasion. For example, it may be provided that the wearing and/or covering layer is laid as a pre-produced overlay layer, such as based on melamine, onto the printed carrier and bonded to it by pressure and/or heat impact. Moreover, it may be preferred that for the formation of the wearing and/or covering layer also a radiation curable composition, such as a radiation curable lacquer, e.g. an acrylic lacquer, is applied. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof in order to increase the wear resistance of the layer. In this case, the application can be realized for example by means of rollers, such as rubber rollers, or pouring devices.

Furthermore, the covering layer can be initially partially cured and subsequently a final coating process with a urethane acrylate and a final curing process, such as by use of a gallium emitter, may be carried out.

Moreover, the covering and/or the wearing layer may include agents for reducing the static (electrostatic) charging of the finished laminate. To this end, for example, it may be provided that the covering and/or wearing layer comprise compounds such as choline chloride. The antistatic agent may, for example, be included in a concentration between ≥0.1 wt.-% and ≤40.0 wt.-%, preferably between ≥1.0 wt.-% and ≤30.0 wt.-% in the covering layer and/or composition for forming the wearing layer.

Moreover, it can be provided that in the protective layer or in the wearing or covering layer a structuring, in particular a surface structure matching with the decoration is formed by introducing pores. Herein, it may be provided that the carrier plate already has a structure, and an alignment of a printing tool for applying the decoration and the carrier plate relative to each other is carried out depending on the structure of the carrier plate detected by optical methods. For aligning the printing tool and the carrier plate relative to each other it may be provided that a relative movement between the printing tool and the carrier plate necessary for the alignment process is carried out by a displacement of the carrier plate or by a displacement of the printing tool. Furthermore, it may be provided that a structuring of the decorative panels is implemented after the application of the covering and/or wearing layer. For this purpose, it may be preferably provided that as a covering and/or wearing layer a curable composition is applied and a curing process is carried out only to the extent that only a partial curing of the covering and/or wearing layer occurs. In the thus partially cured layer a desired surface structure is embossed by means of suitable tools, such as a hard metal structure roller or a die. Herein, the embossing process is carried out in accordance with the applied decoration. In order to ensure a sufficient matching of the structure to be introduced with the decoration it may be provided that the carrier plate and the embossing tool are aligned relative to each other by corresponding relative movements. Subsequently to the introduction of the desired structure into the partially cured covering and/or wearing layer a further curing process of the now structured covering and/or wearing layer is carried out.

In addition, a backing layer may be applied onto the side opposite to the decorative side.

The method described above enables the production of a panel with a carrier having a particularly high moisture and temperature resistance.

In a further preferred embodiment, it may be provided that prior to step e) an anti-adhesive means is arranged such that at least in the twin belt press it is disposed between the carrier and a conveying means, such as the upper or the lower conveying means, preferably between the carrier and both conveying means. In this embodiment, an adhesion of the carrier to a conveying means can particularly effective be prevented. The anti-adhesive means may, for example, be rolled up on a first roll and be fed together with the carrier through the twin belt press and optionally the further pressing unit, such as the calender, before being rolled up onto another roll. Preferably there is no relative velocity between the anti-adhesive means and the carrier. In other words, the anti-adhesive means preferably moves with the same velocity as the carrier. For example, the anti-adhesive means may comprise a release paper, such as an oil paper. An oil paper, also referred to as wax paper, in a manner known per se means for example a wood-free paper which comprises an organic substance, for example an oil or wax or paraffin, for example is impregnated therewith.

According to a further embodiment step d) may be performed by use of an S-roller. By use of an S-roller as a compression unit a desired compression is possible in a defined way with simple and inexpensive means even at high line speeds. In order to be able to set the corresponding and depending on the desired result appropriate force the roller can be shiftable, for example, in the direction perpendicular to the passing carrier material. Herein, the S-roller may, for example, comprise only a single roller, which exerts a force only in combination with a counter force generated by the belt tension of the conveying means. Alternatively, one or a plurality of counter rollers may be provided, which apply the corresponding counter force.

An S-roller in the sense of the invention means a roller which is arranged such that the carrier passes it in an S-shaped path as is well known to those skilled in the art and is described in detail below with reference to the figures.

Furthermore, optionally a temperature gradient can be set in the twin belt press. This can be achieved, in particular, by a temperature gradient in a direction perpendicular to the conveying direction. In this embodiment, a particularly high line speed can be enabled since a particularly fast heating can be achieved which allows such a high line speed. Herein, moreover, an excessively high temperature effect on the carrier material can be prevented which can prevent damages and enable a particularly high quality. In addition, degassing upon heating of the carrier material can be improved and accelerated which in turn allows a high line speed and further enables a particularly high stability and quality by preventing gas inclusions. In the latter case, in particular, the region below the carrier material can be heated to a higher temperature than the region above the carrier material, i.e. a lower tempering element may have a higher temperature than an upper tempering element. For example, here a temperature gradient in a range of 50° C. can be advantageous.

Regarding further technical features and advantages of the method described above it is hereby explicitly referred to the abovementioned description of the carrier material and the panel.

FIGURES

The invention is further explained below with reference to the Figures and an exemplary embodiment.

DESCRIPTION

Figure 1:
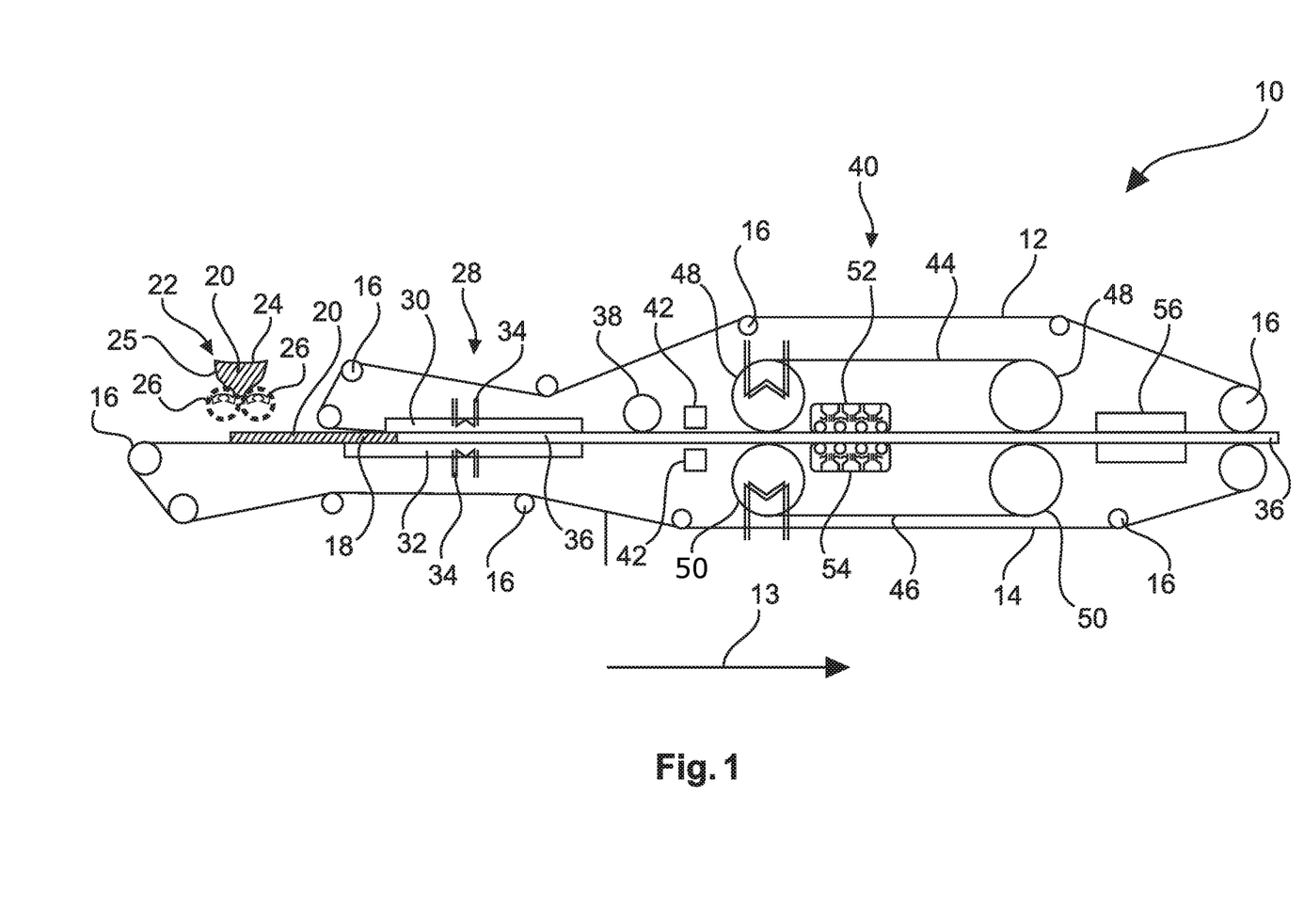
FIG. 1 shows schematically an embodiment of a device for partially producing a decorated wall or floor panel according to the invention.

The device 10 of FIG. 1 is adapted for a method for producing a decorated wall or floor panel. Herein, with reference to FIG. 1 in particular processing stations for the following steps are described:

a) providing a pourable carrier material 20, in particular a granulate, b) placing the carrier material 20 between two belt-like conveying means 12, 14, c) molding the carrier material 20 under the action of temperature to form a web-shaped carrier 36, d) compressing the carrier 36, e) treating the carrier 36 under the action of temperature and pressure, in particular by use of a twin belt press, f) optionally cooling the carrier 36, Following these process steps, the process can comprise further process steps in order to obtain the finished wall or floor panel.

The device 10 according to FIG. 1 first of all comprises two circumferential belt-like conveying means 12, 14, which in particular are guided by deflection rollers 16 such that between them a receiving space 18 for receiving and processing a provided pourable, in particular granular carrier material 20 is formed. The carrier material 20 comprises a matrix material and a solid material, wherein the matrix material, based on the carrier material, is present in an amount from ≥25 wt.-% to ≤55 wt.-%, in particular from ≥35 wt.-% to ≤45 wt.-%, and wherein the solid material, based on the carrier material, is present in an amount from ≥45 wt.-% to ≤75 wt.-%, in particular from ≥55 wt.-% to ≤65 wt.-%, and wherein the matrix material and the solid material together, based on the carrier material 20, are present in an amount of ≥95 wt.-%, in particular ≥99 wt.-%, wherein the solid material, based on the solid material, is formed to at least 50 wt.-%, in particular to at least 80 wt.-%, in particular to at least 95 wt.-% of a solid composition consisting of at least a first layered silicate powder and a second layered silicate powder, and the matrix material, based on the matrix material, is formed to at least 50 wt.-%, in particular at least 80 wt.-%, in particular at least 95 wt.-%, by a plastic composition consisting of a homopolymer and at least a first copolymer and a second copolymer.

In particular, the carrier material 20 may further be provided by use of a kneader mixer, in which the starting materials are mixed and conveyed by means of a worm and thus are pressed through a perforated plate and cut in small particles, for example, by means of an angled cutter, so as to obtain a granulate material.

The conveying means 12, 14 may be at least partially constructed of polytetrafluoroethylene, for example, be coated therewith. Furthermore, the conveying means 12, 14 may at least partially be roughened or structured in particular on their side facing the receiving space 18. Moreover, the conveying means 12, 14 may have a width in a range of about 1.5 m.

In order to apply the carrier material 20 between the belt-like conveying means 12, 14 or in the receiving space 18, a discharge unit 22 with one or a plurality of discharge heads 24 is provided, by means of which the carrier material 20 can be placed on the lower conveying means 14. The discharge heads 24 can comprise a funnel 25 which applies the carrier material 20 onto corresponding scattering rollers 26, whereupon the carrier material 20 can be scattered onto the lower conveying means 14.

In order to ensure a homogeneous application of the carrier material 20 onto the lower conveying means 14 a sensor for checking the placement of the carrier material 20 between the two belt-like conveying means 12, 14 may be provided. The sensor can in particular be coupled with the discharge unit 22 in order to immediately correct a potentially inaccurate filling of the receiving space 18.

In order to enable a homogeneous distribution of the carrier material 20, moreover, vibrators may be provided. These may, for example, act on the lower conveying means 14 and may be arranged, for example, below the lower conveying means 14, such that the carrier material 20 is finely distributed.

In order to prevent an unwanted contamination and a damage of downstream processing stations, moreover a sensor for detecting metals can be provided, which is able to detect inadvertently introduced metal.

Furthermore, a molding unit 28 is provided in the conveying direction of the conveying means 12, 14, which is indicated by the arrow 13, wherein the molding unit is adapted to mold the carrier material 20 under the action of temperature or heat to fuse the carrier material 20 while forming a web-shaped carrier 36. For this purpose, the molding unit 28 may have two plate-like molding means 30, 32 which can be heated by one or a plurality of heating means 34, for example by means of a thermal oil. As a result, the carrier material 20 can be heated until, for example depending on the melting point of the carrier material 20 or a portion thereof, it has reached a temperature, for example and depending on the material used, from $\geq 180°$ to $\leq 200°$ C. To this end, the molding unit 28 or the molding means 30, 32 can be heated, for example, to a temperature of up to 250° C. To this end, for example, one or for setting a temperature gradient a plurality of independently adjustable heating sections can be provided. For example, the entire molding means 30, 32 which may have a length of several meters, can be heatable, or only a part thereof can be heatable.

Furthermore, the molding unit 28 can in particular comprise a parallel gap which can be formed by the plate-like molding means 30, 32. In this case, however, at the inlet an inlet mouth can be provided by a conical form in order to allow an improved inflow of the carrier material 20. The force acting on the carrier material 20 may here be in a range of $>0$ kg/m2 up to $\leq 1$ kg/m2. In this manner, in particular a uniform pressurization can be provided without the provision of a pressure profile or a pressure gradient.

In FIG. 1 it can also be seen that the lower molding means 32 is longer than the upper molding means 30 and also starts before the upper one. Thereby it can be achieved that a processing takes place only when the carrier material 20 is already molten or is at least partially molten and at least partially softened. This enables a particularly defined shaping process.

Figure 2:
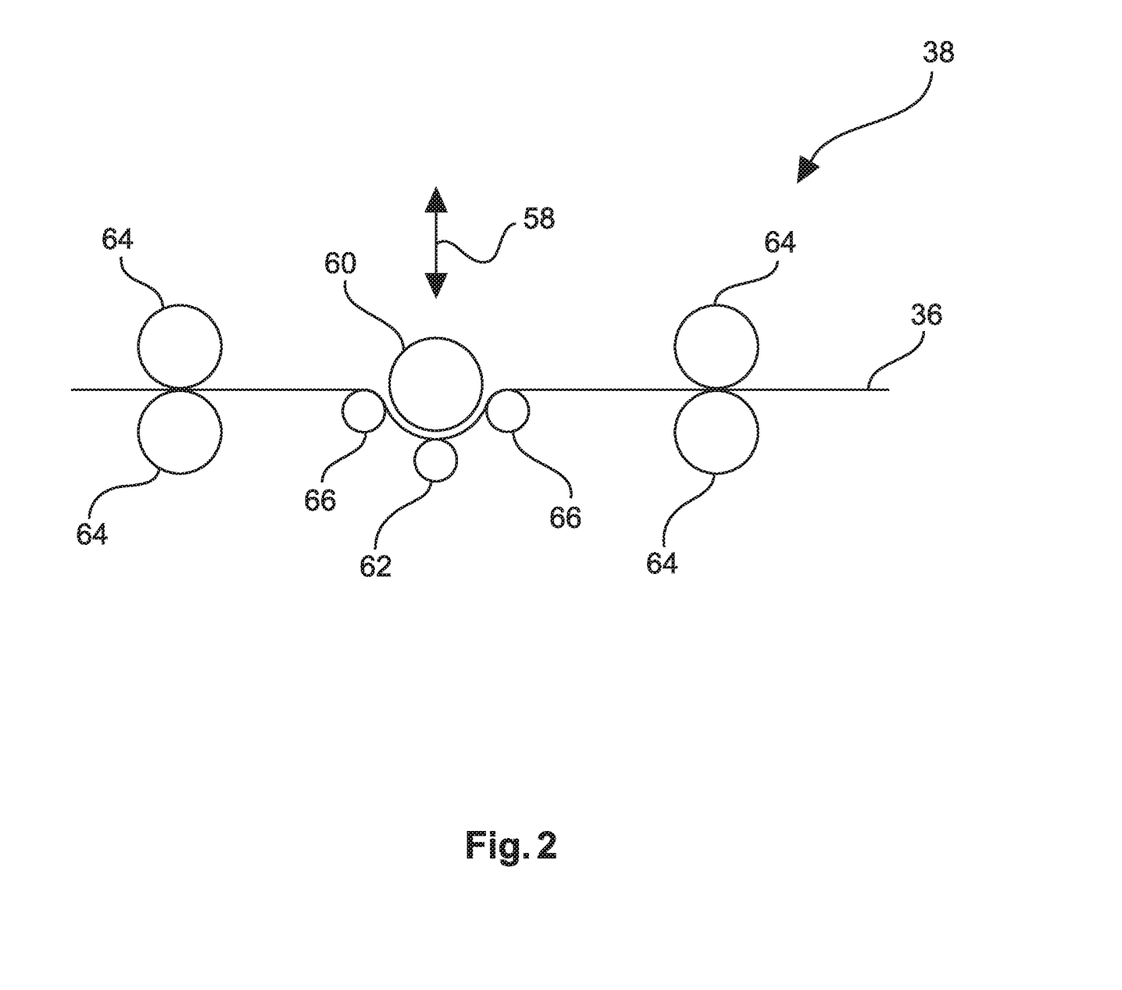
FIG. 2 shows an exemplary S-roller for performing a step of the method.

In the further course in the conveying direction of the conveying units 12, 14 the web-shaped carrier 36 is fed through a pressing means 38. The pressing means 38 can, for example, include an S-roller, which is shown in detail in FIG. 2. The S-roller may be displaceable substantially perpendicular to the surface of the carrier 36 and thus to the travel direction of the carrier 36, as indicated by the arrow 58, so that the desired pressures can be particularly advantageously be adjustable. Furthermore, the pressing means 38 can for example apply a pressure onto the carrier 36 in a range of $\geq 1$ kg/m2 to $\leq 3$ kg/m2. The S-roller comprises a main roller 60 which acts on the web-shaped carrier 36. Here, in some circumstances the belt tension may be sufficient as counter-pressure, however, it is preferred that at least one counter-pressure roller 62 is provided. For a suitable guidance of the web-shaped carrier 36, moreover, two pairs of calender rollers 64 and optionally deflection rollers 66 may be provided which may provide a suitable belt tension. In FIG. 2 it can be seen that the web-shaped carrier 36 is fed twice in an S-shaped manner around the deflection rollers 66 and the main roller 60, and it is this type of guidance that specifies the term S-roller. In detail, the web-shaped carrier 36 can be wound around the main roller 60 over a range of approximately 50% or more. The temperature of the carrier 36 at the entry into the pressing means 38 corresponds in particular to the temperature present at the exit of the molding unit 28.

From the pressing means 38 the carrier 36 is subsequently fed to a further pressing means 40. In order to compensate any heat loss of the carrier 36 or to intentionally heat the carrier 36 further or to cool the carrier 36 one or a plurality of further tempering means 42 can be provided between the pressing means 38, 40.

Returning to the pressing means 40, this can advantageously be a twin belt press which in particular may comprise steel belts 44, 46, wherein the belts 44, 46 of the twin belt press may be guided by deflection rollers 48, 50. The deflection rollers 48, 50 can, for example, be heated, for example by means of a thermal oil heating and/or the rollers on the same side of the gap may be disposed at a distance in a range from $\geq 1$ m to $\leq 2$ m, for example 1.5 m, from each other, wherein the belts 44, 46 may have a width in a range of about 1.5 m. According to FIG. 1, the carrier 36 disposed between the conveying means 12, 14 is guided between the deflection rollers 48, 50 and thus between the belts 44, 46, such as in particular steel belts. On the side of the belts 44, 46 opposite to the carrier 36 respective pressing and/or heating means 52, 54 are provided. These can both heat and slightly compress the conveying means 12, 14 and thus the carrier 36. For this purpose, for example, an air-heating can be provided and a plurality of rollers, which may enable an intermittent pressing. Here, a temperature in a range of up to 250° C. may act on the carrier 36. For example, the temperature may be in a range of $\geq 25°$ C. to $\leq 35°$ C. above the melting temperature or softening temperature of the carrier material or a portion thereof. Furthermore, a pressure may act on the carrier 36 such that the carrier 36 is compressed in step e) by a factor of $\leq 7.5\%$, preferably $\leq 5\%$, for example in a range from $\geq 0.1$ mm to $\leq 0.2$ mm. Here, the pressing and/or heating means 52, 54 can substantially occupy the entire region between the deflecting rollers 48, 50 or only a limited area along the conveying direction. After passing through the pressing means 40, the carrier may have a temperature in a range of 190° C.

Here, the pressing means 40 may have a varying pressure profile, for example starting with 6 mm and ending with 4.1 mm, or advantageously be configured as an isochoric press.

In the conveying direction downstream of the pressing means 40 according to FIG. 1 a cooling means 56 is arranged by means of which the carrier can be cooled down to a temperature which is, for example, in a range of $\leq 35°$ C. Here, the cooling means 56 may for example be based on water cooling and can comprise a plurality of cooling zones in order to allow a defined cooling by use of exactly adjustable cooling programs. The length of the cooling zone can correspond to the effective length of the pressing means 40. Downstream of the cooling means 56, for example, another cooling belt may be provided.

After these process steps the carrier 36 which may have a final thickness in a range from $\geq 3$ mm to $\leq 5$ mm, for example 4.1 mm, may be directly further processed or stored, such as a web-shaped carrier 36 or as an already separated plate-shaped carrier 36.

At this point, the further steps may follow:

g) optionally applying a decorative subsurface onto at least a portion of the carrier 36, h) applying a decoration replicating a decoration template onto at least a portion of the carrier 36, i) applying a protective layer onto at least a portion of the decoration.

j) optionally structuring the protective layer, and k) optionally treating the carrier 36 for electrostatic discharge prior to one of the aforementioned steps.

The invention claimed is:

1. Carrier material for producing a carrier for a decorated wall or floor panel, wherein the carrier material comprises a matrix material and a solid material, wherein the matrix material, based on the carrier material, is present in an amount from ≥25 wt.-% to ≤55 wt.-%, and wherein the solid material, based on the carrier material, is present in an amount from ≥45 wt.-% to ≤75 wt.-%, and wherein the matrix material and the solid material together, based on the carrier material, are present in an amount of ≥95 wt. %, wherein the solid material, based on the solid material, is formed to at least 50 wt.-% of a solid composition comprising at least a first layered silicate powder and a second layered silicate powder, and the matrix material, based on the matrix material, is formed to at least 50 wt.-% by a plastic composition comprising a homopolymer and at least a first copolymer and a second copolymer, wherein the solid composition comprises the first layered silicate powder from ≥35 wt.-% to ≤85 wt.-%, based on the solid composition, in the form of particles having a particle size $D_{50}$ in a range from ≥3 μm to ≤6 μm, and/or having a particle size $D_{98}$ in a range from ≥10 μm to ≤30 μm, and comprises the second layered silicate powder from ≥15 wt.-% to ≤65 wt.-%, based on the solid composition, in the form of particles having a particle size $D_{50}$ in a range from ≥6 μm to ≤10 μm, and/or having a particle size $D_{98}$ in a range from ≥20 μm to ≤40 μm.

2. Carrier material according to claim 1, wherein the first layered silicate powder and/or the second layered silicate powder comprise talcum.

3. Carrier material according to claim 1, wherein the homopolymer, the first copolymer and the second copolymer comprise polypropylene.

4. Carrier material according to claim 1, wherein the first copolymer comprises a heterophasic polypropylene and the second copolymer comprises an ethylene-propylene copolymer and an isotactic polypropylene.

5. Carrier material according to claim 1, wherein the second copolymer has an ethylene content from ≥8 wt.-% to ≤22 wt.-%.

6. Carrier material according to claim 1, wherein the melt flow rate of the homopolymer is greater than the melt flow rate of the first copolymer and the second copolymer.

7. Carrier material according to claim 1, wherein the melt flow rate of the second copolymer is greater than the melt flow rate of the first copolymer.

8. Carrier material according to claim 1, wherein the homopolymer, based on the plastic composition, is present in a proportion from ≥10 wt.-% to ≤40 wt.-% and/or that the first copolymer, based on the plastic composition, is present in a proportion from ≥40 wt.-% to ≤70 wt.-% and/or that the second copolymer, based on the plastic composition, is present in a proportion from ≥10 wt.-% to ≤40 wt.-%.

9. Carrier material according to claim 1, wherein the matrix material in addition to the plastic composition comprises at least one coloring additive.

10. Carrier material according to claim 8, wherein the coloring additive is a pigment preparation based on thermoplastic carrier materials, which has a temperature resistance up to at least 230° C. and a melting range from 95° C. to 125° C.

11. Carrier material according to claim 1, wherein the matrix material comprises polyethylene in the form of LDPE.

12. Carrier material according to claim 1, wherein the solid material in addition to the solid composition comprises at least one further solid.

13. Carrier material according to claim 11, wherein the further solid has a bulk density in a range of ≤2000 kg/m³ and/or that the further solid is selected from the group consisting of wood, expanded clay, volcanic ash, pumice, cellular concrete, inorganic foams and cellulose.

14. Decorated panel, in particular decorated wall or floor panel, comprising a carrier and a decoration applied onto the carrier, wherein in particular a covering layer provided with a structure is applied onto the decoration, wherein the carrier comprises a carrier material according to claim 1.

* * * * *